(12) United States Patent
Grieco et al.

(10) Patent No.: US 6,954,447 B2
(45) Date of Patent: Oct. 11, 2005

(54) METHOD AND APPARATUS FOR UPLINK SYNCHRONIZATION IN WIRELESS COMMUNICATIONS

(75) Inventors: Donald M. Grieco, Manhassett, NY (US); Aykut Bultan, Bayside, NY (US); Charles Dennean, Melville, NY (US); Jung-Lin Pan, Selden, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/973,134

(22) Filed: Oct. 26, 2004

(65) Prior Publication Data

US 2005/0099986 A1 May 12, 2005

Related U.S. Application Data

(60) Provisional application No. 60/518,141, filed on Nov. 7, 2003.

(51) Int. Cl.[7] .............................. H04B 7/216; H04L 7/04
(52) U.S. Cl. ...................... 370/335; 370/370; 370/342; 370/509; 375/145; 375/358
(58) Field of Search ................................ 370/335, 342, 370/503, 507, 509, 514, 515, 519, 520; 375/130, 141, 145, 148, 149, 354, 355, 358, 362, 363, 364, 365, 366, 368

(56) References Cited

U.S. PATENT DOCUMENTS

| | | | | | |
|---|---|---|---|---|---|
| 6,134,286 | A | * | 10/2000 | Chennakeshu et al. | 375/365 |
| 6,516,007 | B1 | * | 2/2003 | Hong et al. | 370/515 |
| 6,570,918 | B1 | * | 5/2003 | Rademacher | 375/232 |
| 6,597,676 | B1 | * | 7/2003 | Ariyoshi et al. | 370/335 |
| 6,654,432 | B1 | * | 11/2003 | O'Shea et al. | 375/354 |
| 6,829,253 | B1 | * | 12/2004 | Koorapaty et al. | 370/514 |

* cited by examiner

*Primary Examiner*—Ricky Ngo
*Assistant Examiner*—Soon D. Hyun
(74) *Attorney, Agent, or Firm*—Volpe and Koenig, P.C.

(57) ABSTRACT

A method and system for uplink (UL) synchronization of an uplink transmission from a plurality of wireless transmit/receive units (WTRUs) to a Node-B in a code division multiple access (CDMA) system. A Node-B receives a transmission including a UL synchronization (SYNC_UL) sequence from a WTRU. A sampler samples the transmission at a sampling rate which is higher than a chip rate. The samples are down-sampled and the SYNC_UL sequence is detected at a lower rate. A first significant path location of the detected SYNC_UL sequence is determined, and based on the first significant path location, a final significant path location is determined. The final significant path location is quantized and UpPCH$_{POS}$ is transmitted to the WTRU to adjust a UL transmission timing.

12 Claims, 2 Drawing Sheets

180
METHOD AND APPARATUS FOR UPLINK SYNCHRONIZATION IN WIRELESS COMMUNICATIONS

CROSS REFERENCE TO RELATED APPLICATIONS

This application claims the benefit of U.S. provisional application No. 60/518,141 filed Nov. 7, 2003, which is incorporated by reference as if fully set forth.

FIELD OF INVENTION

The present invention is related to wireless communications. More particularly, the present invention is a method and system for uplink (UL) synchronization in wireless communications.

BACKGROUND

UL synchronization is a procedure that controls the transmit time of a wireless transmit/receive unit (WTRU) in a cell such that UL transmissions from a plurality of WTRUs arrive at a Node-B at the same time. In general, each WTRU has a different propagation delay in a cell covered by a Node-B. Therefore, if there is no synchronization mechanism involved, UL transmissions from WTRUs arrive at different times at the Node-B, which increases intra-cell interference. When UL transmissions are aligned with each other, due to the orthogonality of spreading codes, the intra-cell interference is reduced significantly.

When a WTRU is powered on, the WTRU first establishes downlink (DL) synchronization with a cell using a DL synchronization (SYNC_DL) sequence transmitted in a DL pilot channel (DwPCH). Only after the WTRU has established DL synchronization, can the WTRU start the UL synchronization procedure. UL synchronization is achieved during a random access procedure and therefore involves a UL pilot channel (UpPCH) and a physical random access channel (PRACH).

Although a WTRU establishes DL synchronization and can receive downlink signals from the Node-B, the distance between the WTRU and the Node-B is still uncertain. This leads to unsynchronized UL transmissions. Therefore, the first UL transmission from the WTRU is limited to a special time-slot, an uplink pilot time slot (UpPTS), in order to reduce interference in traffic time slots.

In order to initiate a call, a WTRU first transmits a UL synchronization (SYNC_UL) sequence to a Node-B through a UpPCH. The available SYNC-UL sequences are broadcast through DwPCH. Under the current third generation partnership project (3GPP) standards, eight (8) SYNC-UL sequences are available to a Node-B. For initial transmission of the SYNC_UL sequence, open loop UL synchronization control is used for the UpPCH. The WTRU estimates the propagation delay $\Delta t_p$ based upon the path loss measured on the received primary common control physical channel (P-CCPCH) and/or DwPCH. However, this estimation of the propagation delay is not accurate or reliable.

After the detection of the SYNC-UL sequence in a searching window, the Node-B evaluates the timing of UL transmissions of SYNC_UL sequences, and replies by sending adjustment information to the WTRU to modify its UL transmission timing for the next transmission. This is done with a fast physical access channel (FPACH) within the following four (4) sub-frames. After sending the FPACH, the UL synchronization is established. The UL synchronization procedure is also used for the re-establishment of the UL synchronization when the UL is out of synchronization.

SUMMARY

The present invention is a method and system for UL synchronization of UL wireless transmissions from a plurality of WTRUs to a Node-B. A Node-B receives a transmission including a SYNC_UL sequence from a WTRU. A sampler samples the transmission at a sampling rate which is higher than a chip rate. The samples are down-sampled and the SYNC_UL sequence is detected at a lower rate. A first significant path location of the detected SYNC_UL sequence is determined and, based on the first significant path location, a final significant path location is determined. The final significant path location is quantized and UL timing information ($UpPCH_{POS}$) is transmitted to the WTRU to adjust a UL transmission timing of the WTRU.

DETAILED DESCRIPTION OF THE PREFERRED EMBODIMENT(S)

Figure 1:
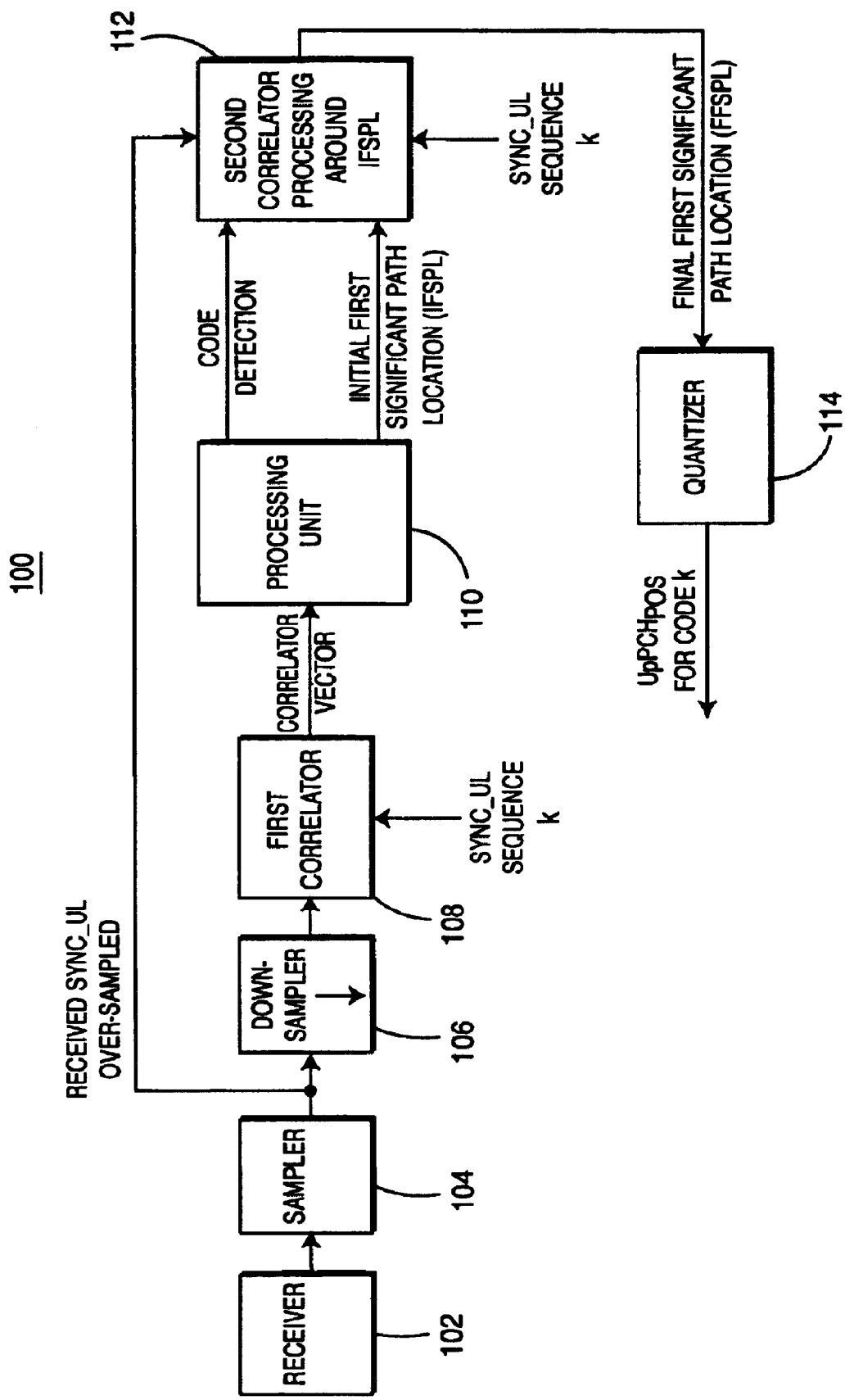
FIG. 1 is a block diagram of an apparatus for uplink synchronization in accordance with the present invention.

The present invention will be described with reference to the drawing figures wherein like numerals represent like elements throughout.

Hereafter, the terminology "wireless transmit/receive unit" (WTRU) includes but is not limited to a user equipment, a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

The features of the present invention may be incorporated into an integrated circuit (IC) or be configured in a circuit comprising a multitude of interconnecting components.

The preferred embodiment of the present invention will be described with reference to the current 3GPP standards. However, it should be understood that a specific sampling rate, processing rate, or any numerical quantification which are set forth hereinafter are provided only as an illustration, not as a limitation, of the preferred embodiment of the present invention, and any other sampling rate, processing rate or numerical quantification may be adopted in implementing the teachings of the present invention.

FIG. 1 is a block diagram of an apparatus 100 for UL synchronization in accordance with the present invention. The apparatus 100 comprises a receiver 102, a sampler 104, a down-sampler 106, a first correlator 108, a processing unit 110, a second correlator 112, and a quantizer 114.

A WTRU transmits a SYNC_UL sequence to a Node-B through the UpPCH before transmitting messages via a random access channel (RACH). The Node-B monitors the UpPCH for detecting SYNC_UL sequences transmitted from WTRUs. Once the Node-B detects a SYNC_UL sequence, the Node-B transmits a response to the detected SYNC_UL sequence via an FPACH. The response includes UL synchronization information, $UpPCH_{POS}$, (which is a timing difference of receipt of the SYNC_UL sequence from the WTRU with respect to a reference time at the Node-B). After the WTRU receives the response, the WTRU synchronizes UL transmissions in accordance with the $UpPCH_{POS}$ included in the response message.

The receiver 102 receives transmissions via the UpPCH from the WTRU and forwards it to the sampler 104. The sampler 104 samples the transmission at a rate which is substantially higher than a chip rate, 1/Tc. Under the current 3GPP standard, UL synchronization is controlled at a resolution of Tc/8. Therefore, it is preferred for the sampler 104 to sample the transmission eight (8) times the chip rate, 8/Tc. The sampler 104 outputs the sampled data to both the down-sampler 106 and the second correlator 112.

The down-sampler 106 down-samples the sampled data at a lower rate, preferably at the chip rate, 1/Tc. In accordance with the preferred embodiment, the down-sampler 106 selects one out of eight (8) samples. The down-sampled samples are forwarded to the first correlator 108.

The first correlator 108 performs correlation of the down-sampled samples with each of a plurality of SYNC_UL sequences. Under the current 3GPP standards, eight (8) SYNC_UL sequences are assigned to each Node-B. Therefore, preferably, the first correlator 108 generates correlation results with each of eight (8) SYNC_UL sequences, although the specific number of sequences is not required.

Initially, the WTRU determines UL transmission timing of a SYNC_UL sequence based on a measured propagation delay of the DwPCH and/or P-CCPCH. The initial delay measurement is used to restrict the search size of the first correlator 108. However, it is not very reliable. Therefore, the first correlator 108 needs to cover the whole cell size. For example, a cell radius of 11.5 km corresponds to approximately 49 chips for a chip rate of 1.28 Mcps. Since the Node-B observes a two-way propagation delay, the search window size for the first correlator 108 should be greater than 98 chips for the worst case. The output of the first correlator 108 consists of lag positions and corresponding complex valued correlation results. This output can be used as an initial channel estimate.

The correlation results are output to the processing unit 110. The processing unit 110 determines whether any SYNC_UL sequences have been detected. In detecting a SYNC_UL sequence, the processing unit 110 calculates the average signal power of each SYNC_UL sequence and compares it to a noise threshold. If the average signal power of each SYNC_UL sequence is above the noise threshold, the processing unit 110 outputs to the second correlator 112 that the SYNC_UL sequence has been detected. If the average signal power of each SYNC_UL sequence is not above the noise threshold, the processing unit 110 performs no further actions, and the receiver continues to monitor the UpPCH. The processing unit 110 also determines an initial first significant path location (IFSPL) of the detected SYNC_UL sequence. The first significant path (FSP) is the first path (in time) in the channel impulse response above the noise threshold. The IFSPL is determined at a chip rate resolution.

Under the current 3GPP standard, the minimum step size required for UL synchronization is Tc/8. Therefore, the Node-B is required to determine UL timing information, (UpPCH$_{POS}$), preferably at a resolution of Tc/8. The second correlator 112 receives samples sampled at eight (8) times the chip rate from the sampler 104, and performs correlation of the samples with the detected SYNC_UL sequence around the IFSPL. Since the second correlator 112 performs correlation only around the detected IFSPL instead of the whole cell size, the correlation in the second correlator 112 is performed much more quickly. The second correlator 112 determines a final first significant path location (FFSPL) at a resolution of Tc/8.

The apparatus 100 may further, and optionally, comprise a quantizer 114 to quantize the FFSPL. Under the current 3GPP standards, the UpPCH$_{POS}$ is coded with 11 bits with a step size of Tc/8. The quantizer 114 quantizes the FFSPL to the closest multiple of Tc/8. This quantized value is converted to the UpPCH$_{POS}$ for the detected SYNC_UL sequence, and transmitted to the WTRU for UL synchronization of the next UL transmissions.

Figure 2:
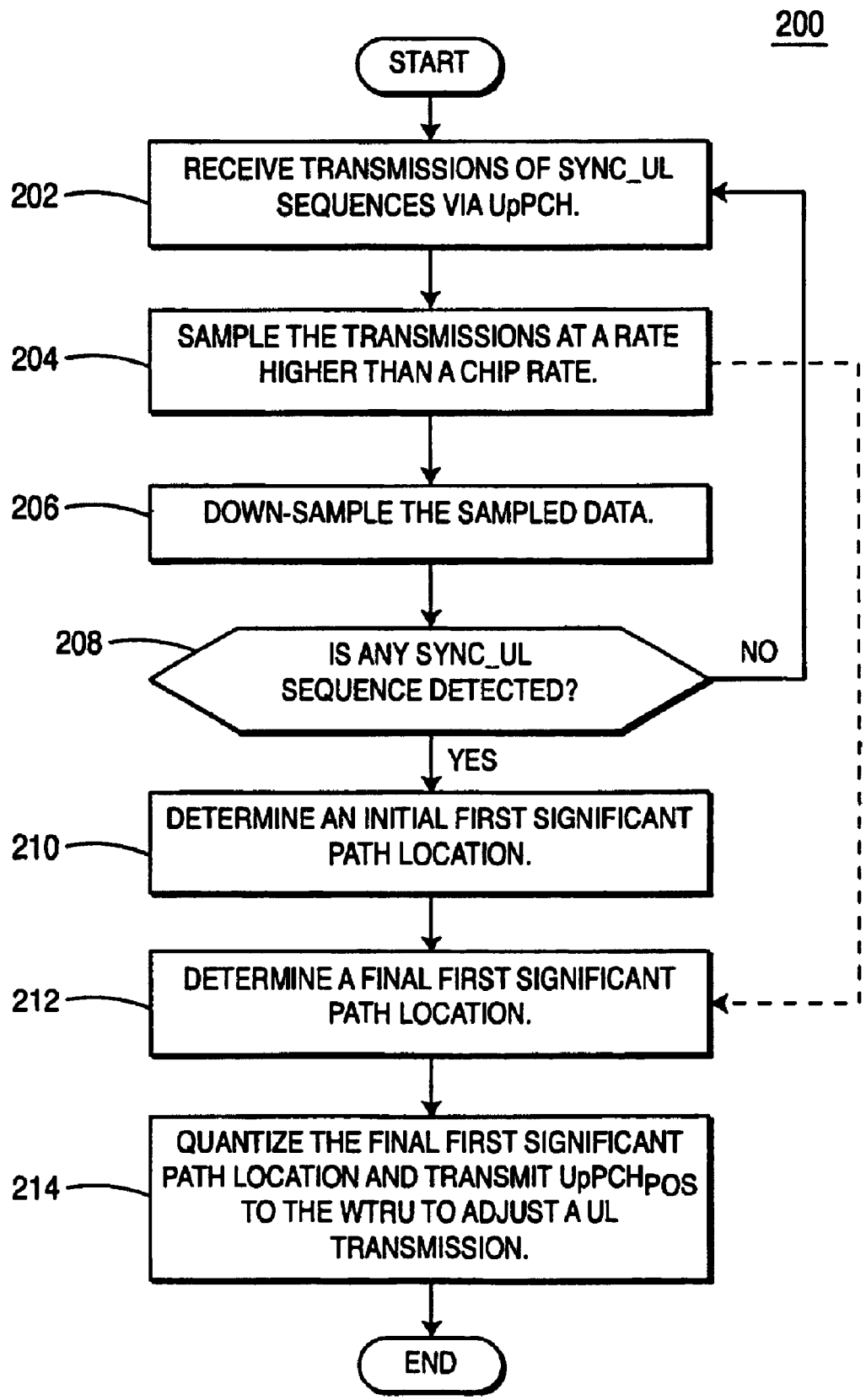
FIG. 2 is a flow diagram of a process for uplink synchronization in accordance with the present invention.

FIG. 2 is a flow diagram of a process 200 for uplink synchronization in accordance with the present invention. The process 200 comprises two primary steps: first, to determine an IFSPL of a SYNC_UL sequence (step 210), and then to zoom in around the IFSPL and perform a higher resolution search for an FFSPL (step 212). The process 200 commences when UL transmissions are received via an UpPCH (step 202). The transmissions are sampled by a sampler at preferably eight (8) times the chip rate (step 204). The sampled data is down-sampled preferably to a chip rate (step 206). The down-sampled data is correlated with SYNC_UL sequences, and it is determined whether any SYNC_UL sequence has been detected (step 208). In detecting a SYNC_UL sequence, an average signal power of each SYNC_UL sequence is calculated and compared to a noise threshold. If the average signal power of each SYNC_UL sequence is above the noise threshold, a detection of the SYNC_UL sequence is declared, and if the average signal power of an SYNC_UL sequence is not above the noise threshold, the process returns to step 202 to continue to monitor the UpPCH. If a SYNC_UL sequence is detected, the process 200 proceeds to determine an IFSPL of the detected SYNC_UL sequence, preferably at the chip rate (step 210). Once the IFSPL is determined, the FFSPL is determined using the sampled data sampled at eight (8) times the chip rate and the IFSPL (step 212). The FFSPL is quantized and converted to the UpPCH$_{POS}$. The Node-B transmits the UpPCH$_{POS}$ to a WTRU to be used in adjustment of UL transmission timing for the next transmission (step 214).

While this invention has been particularly shown and described with reference to preferred embodiments, it will be understood by those skilled in the art that various changes in form and details may be made therein without departing from the scope of the invention described hereinabove.

What is claimed is:

1. A method for synchronizing an uplink (UL) transmission from a wireless transmit/receive unit (WTRU) to a Node-B in a code division multiple access (CDMA) wireless communication system, the method comprising:
   (a) receiving a transmission including a UL synchronization (SYNC_UL) sequence from a WTRU;
   (b) sampling the transmission at a sampling rate;
   (c) down-sampling the samples;
   (d) detecting the SYNC_UL sequence in the transmission by processing the down-sampled samples;
   (e) determining a first significant path location of the detected SYNC_UL sequence;
   (f) determining a final significant path location at the sampling rate using the detected first significant path location;
   (g) transmitting a UL synchronization adjustment message generated based on the final significant path location to the WTRU; and
   (h) adjusting a UL transmission timing at the WTRU.

2. The method of claim 1 wherein the transmission is sampled at eight (8) times a chip rate at step (b) and processed at a chip rate at step (c).

3. The method of claim 1 wherein the final significant path location is quantized for transmission.

4. The method of claim 3 wherein the final significant path location is quantized with eleven (11) bits.

5. The method of claim 1 wherein the UL transmission timing is adjusted by an eighth of the chip duration.

6. The method of claim 1 wherein the SYNC_UL sequence is detected if an average signal power of the SYNC_UL sequence is above a noise threshold.

7. An apparatus for uplink (UL) synchronization in a code division multiple access (CDMA) wireless communication system, the apparatus comprising:

a receiver for receiving a transmission including a UL synchronization (SYNC_UL) sequence from a wireless transmit/receive unit (WTRU);

a sampler for generating samples of the transmission at a sampling rate;

a down-sampler for down-sampling the samples at a rate lower than the sampling rate;

a first processing unit for detecting a SYNC_UL sequence in the transmission by processing down-sampled samples, and determining a first significant path location of the detected SYNC_UL sequence;

a second processing unit for determining a final significant path location at the sampling rate using the detected first significant path location; and, a transmitter for transmitting a UL synchronization adjustment message generated based on the final significant path location to the WTRU to adjust a UL transmission timing of the WTRU.

8. The apparatus of claim 7 wherein the sampler samples the transmission at eight (8) times the chip rate.

9. The apparatus of claim 7 further comprising a quantizer for quantizing the final significant path location.

10. The apparatus of claim 9 wherein the quantizer quantizes the final significant path location with eleven (11) bits.

11. The apparatus of claim 7 wherein the UL transmission timing is adjusted by an eighth of the chip duration.

12. The apparatus of claim 7 wherein the first processing unit detects the SYNC_UL sequence by comparing an average signal power of the SYNC_UL sequence to a noise threshold.

\* \* \* \* \*

UNITED STATES PATENT AND TRADEMARK OFFICE
CERTIFICATE OF CORRECTION

| | | |
|---|---|---|
| PATENT NO. | : 6,954,447 B2 | Page 1 of 1 |
| APPLICATION NO. | : 10/973134 | |
| DATED | : October 11, 2005 | |
| INVENTOR(S) | : Grieco et al. | |

It is certified that error appears in the above-identified patent and that said Letters Patent is hereby corrected as shown below:

IN THE SPECIFICATION

At column 1, line 48, after the word "available", delete "SYNC-UL" and insert therefor --SYNC_UL--.

At column 1, lines 50-51 after the words "eight (8)", delete "SYNC-UL" and insert therefor --SYNC_UL--.

At column 1, line 58, after the words "of the", delete "SYNC-UL" and insert therefor --SYNC_UL--.

Signed and Sealed this

Twenty-sixth Day of December, 2006

JON W. DUDAS
*Director of the United States Patent and Trademark Office*